US007979640B2

(12) United States Patent
Chaudhry et al.

(10) Patent No.: US 7,979,640 B2
(45) Date of Patent: Jul. 12, 2011

(54) CACHE LINE DUPLICATION IN RESPONSE TO A WAY PREDICTION CONFLICT

(75) Inventors: Shailender Chaudhry, San Francisco, CA (US); Robert E. Cypher, Saratoga, CA (US); Martin Karlsson, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 532 days.

(21) Appl. No.: 12/181,266

(22) Filed: Jul. 28, 2008

(65) Prior Publication Data

US 2010/0023701 A1    Jan. 28, 2010

(51) Int. Cl.
*G06F 12/08* (2006.01)
(52) U.S. Cl. ............... 711/128; 711/165; 711/E12.018; 711/E12.061
(58) Field of Classification Search ................... None
See application file for complete search history.

(56) References Cited

U.S. PATENT DOCUMENTS 5,752,069 A * 5/1998 Roberts et al. ............... 712/23
5,764,946 A * 6/1998 Tran et al. ................... 712/239
5,848,433 A * 12/1998 Tran et al. ................... 711/137

OTHER PUBLICATIONS

Spjuth, Mathias, et al., "The Elbow Cache: A Power-Efficient Alternative to Highly Associative Caches", Technical report 2003-046, Department of Information Technology, Uppsala University, http://www.it.uu.se/research/reports/2003-046/2003-046-nc.ps, 2003.
Spjuth, Mathias, et al., "Low-Power and Conflict Tolerant Cache Design", Technical report 2004-024, Department of Information Technology, Uppsala University, http://www.it.uu.se/research/publications/reports/2004-024/, 2004.

* cited by examiner

*Primary Examiner* — Kevin Verbrugge
(74) *Attorney, Agent, or Firm* — Park, Vaughan, Fleming & Dowler LLP; Anthony Jones

(57) ABSTRACT

Embodiments of the present invention provide a system that handles way mispredictions in a multi-way cache. The system starts by receiving requests to access cache lines in the multi-way cache. For each request, the system makes a prediction of a way in which the cache line resides based on a corresponding entry in the way prediction table. The system then checks for the presence of the cache line in the predicted way. Upon determining that the cache line is not present in the predicted way, but is present in a different way, and hence the way was mispredicted, the system increments a corresponding record in a conflict detection table. Upon detecting that a record in the conflict detection table indicates that a number of mispredictions equals a predetermined value, the system copies the corresponding cache line from the way where the cache line actually resides into the predicted way.

19 Claims, 3 Drawing Sheets

CACHE LINE DUPLICATION IN RESPONSE TO A WAY PREDICTION CONFLICT

BACKGROUND

1. Field of the Invention

The present invention relates to techniques for improving the performance of computer systems. More specifically, the present invention relates to a method and an apparatus for duplicating cache lines in response to a way prediction conflict in a cache memory.

2. Related Art

Some computer systems include data and/or instruction caches that are "set-associative." Generally, in a set-associative cache, the entries in the cache are logically divided into a number of "sets" and "ways." A "set" is a group of cache entries that are used to store cache lines from the same predetermined range of physical addresses, while a "way" is a logical division of the entries in the cache into two or more similar groups. A set has exactly one entry in each way (e.g., see the set shown by hash marks in way 102 and way 104 in FIG. 1).

Some multi-way caches use "way prediction" to improve performance when accessing cache lines. In such caches, upon accessing (i.e., reading or writing) a cache line in a given way, a cache controller records the way in which the cache line was accessed. When subsequently accessing the cache line, the cache controller uses the recorded way to predict the way in which the cache line resides. Way prediction can speed up cache line accesses by taking advantage of the fact that cache lines are often found in the same way in which the cache line was most recently accessed.

In some caches, the ways are recorded in a "way prediction table." Some of these caches use a function (e.g., a "hash function" or another function) to identify an entry within the way prediction table when recording the way in which the cache line was accessed or when subsequently retrieving the recorded way.

FIG. 1 presents block diagram illustrating a cache 100 that uses way prediction. Cache 100 includes way 102, way 104, cache controller 106, and way prediction table 108. During operation, upon receiving a cache line to be accessed, cache controller 106 computes an entry in way prediction table 108 using the cache line's address as an input into the hash function for way prediction table 108. If there is a way recorded in the entry, cache controller 106 uses the recorded way as a prediction of the way where the cache line resides. Cache controller 106 then checks for the cache line in only the predicted way. Otherwise, if there is no entry in way prediction table 108, cache controller 106 checks both ways for the cache line.

If the cache line is present in the predicted way, cache controller 106 accesses the cache line in that way. Otherwise, cache controller 106 checks the remaining way for the cache line. If the cache line is present in the other way, the way was mispredicted and cache controller 106 accesses the cache line in that way. If the way was mispredicted (or if there was no way recorded in the entry), cache controller 106 records the correct way in way prediction table 108. The entries in way prediction table 108 are updated in this fashion for each misprediction.

Because the entries in way prediction table 108 are updated for each misprediction, some patterns of cache line accesses can negate the benefit of way prediction. One such pattern occurs when two or more cache lines are being accessed in different ways wherein the hash function for way prediction table 108 returns in the same entry in the way prediction table 108 for both cache lines. For example, assume that cache lines A and B are being accessed in an A-B-A-B ... pattern; cache line A in way 102 and cache line B in way 104 (as shown in FIG. 1). Assume further that the hash function for way prediction table 108 returns entry E for both the address for cache line A and the address for cache line B. As described above, accessing cache line A causes cache controller to update entry E in way prediction table 108 to indicate way 102, while accessing cache line B causes cache controller to update entry E in way prediction table 108 to indicate way 104. Thus, when cache lines A and B are accessed in alternating pattern, the way is always mispredicted by cache controller 106. Because of the way misprediction, cache controller 106 incurs additional delay and consumes additional power while first checking in the predicted way and then checking in the other way for each cache line.

SUMMARY

Embodiments of the present invention provide a system that handles way mispredictions in a multi-way cache. Note that the invention can generally be applied to any type of set-associative caching structure. For example, in some embodiments of the present invention, the cache can be L1 cache 204, L2 cache 206, or memory 208 (see FIG. 2). Alternatively, the cache can be translation lookaside buffer (TLB) 212 or branch target buffer (BTB) 214. In some embodiments, the system can be a cache controller 310 (see FIG. 3).

The system starts by receiving requests to access cache lines in the multi-way cache. For each request, the system makes a prediction of a way in which the cache line resides based on a corresponding entry in the way prediction table. The system then checks for the presence of the cache line in the predicted way. Upon determining that the cache line is not present in the predicted way, but is present in a different way, and hence the way was mispredicted, the system increments a record in a conflict detection table corresponding to the entry in the way prediction table. Upon detecting that a record in the conflict detection table indicates that a number of mispredictions based on an entry in the way prediction table equals a predetermined value, the system copies the cache line from the way where the cache line actually resides into the predicted way.

In some embodiments, "accessing" the cache line in the multi-way cache involves reading or writing data to an entry in a way in the multi-way cache.

In some embodiments, upon accessing the cache line in an entry in a way in the multi-way cache, the system updates the corresponding entry in the way prediction table to indicate the way in which the cache line was accessed.

In some embodiments, if the cache line is available in the entry in the predicted way, the system accesses the cache line in the predicted way.

In some embodiments, when the cache line is present in a different way, the system accesses the cache line in the different way.

In some embodiments, when using entries in the way prediction table to make predictions, the system retrieves a recorded way from the corresponding entry in the way prediction table and uses the recorded way to predict the way in which the cache line resides.

In some embodiments, the conflict detection table includes a separate entry for each entry in the way prediction table, and when incrementing the record in the conflict detection table, the system increments the number of mispredictions in the record.

In some embodiments, the conflict detection table does not include a separate entry for each entry in the way prediction table. In these embodiments, when incrementing the record in the conflict detection table, if an existing record is not available in the conflict detection table, the system: allocates an entry in the conflict detection table; records an identifier of the entry in the way prediction table upon which the misprediction was based in the allocated entry; and increments the number of mispredictions in the allocated entry. Otherwise, the system increments the number of mispredictions in an existing entry in the conflict detection table for the entry in the way prediction table upon which the misprediction was based.

Figure 1:
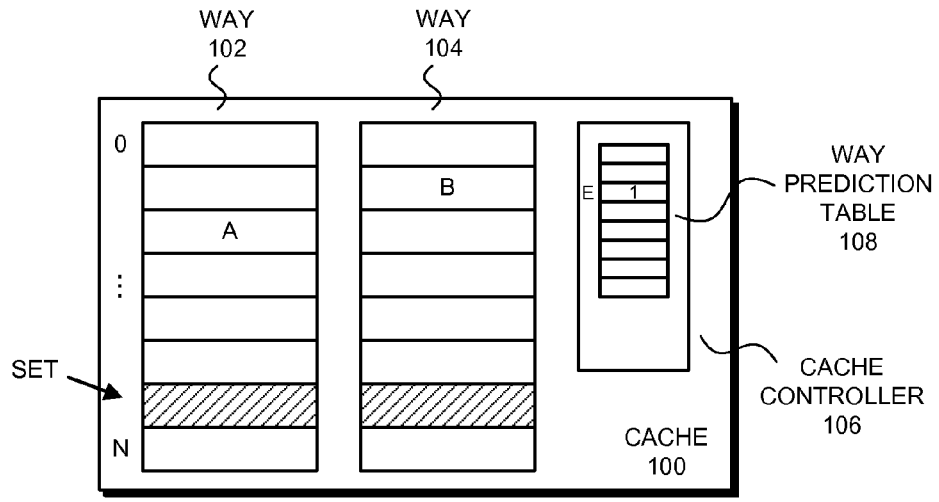
FIG. 1 presents a block diagram illustrating a cache in which alternating accesses can cause conflicting updates of a way prediction table.

For a better understanding of the aforementioned embodiments of the present invention as well as additional embodiments thereof, reference should be made to the detailed description of these embodiments below, in conjunction with the figures in which like reference numerals refer to corresponding parts throughout the figures.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Terminology

The following description includes the term "accesses" with respect to cache lines and entries in other structures. Although this term is known in the art, the following definition is provided to clarify the subsequent description.

Figure 2:
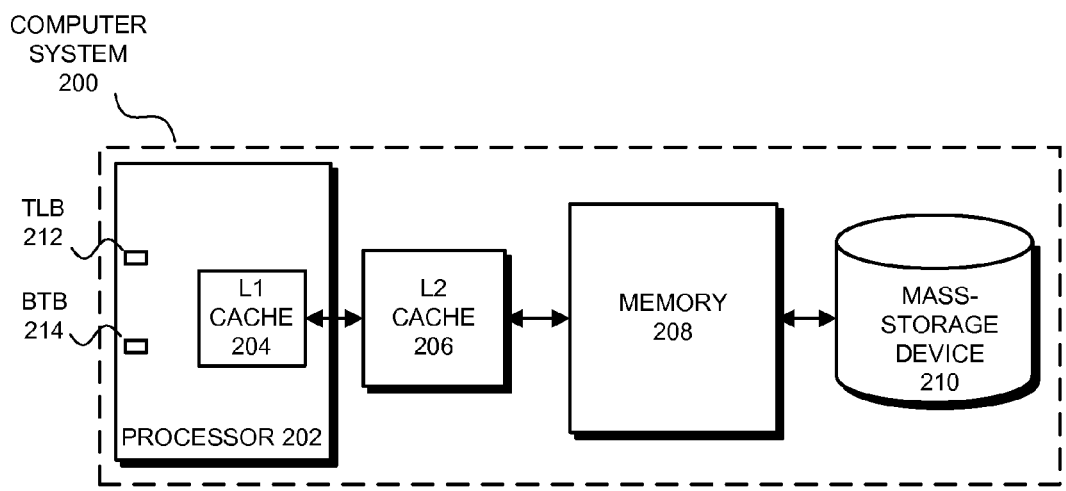
FIG. 2 presents a block diagram of a computer system in accordance with embodiments of the present invention.

The term "access" refers to the operations of reading or writing a cache line, including reads or writes of cache lines from a processor or a lower or higher level of the memory hierarchy (see FIG. 2). In addition, "accesses" can indicate reading or writing data to entries in other structures, such as a branch target buffer or a translation lookaside buffer.

Computer System

FIG. 2 presents a block diagram of a computer system 200 in accordance with embodiments of the present invention. Computer system 200 includes processor 202, L2 cache 206, memory 208, and mass-storage device 210, wherein processor 202 includes L1 cache 204.

Processor 202 can be a general-purpose processor that performs computational operations. For example, processor 202 can be a central processing unit (CPU), such as a microprocessor. Alternatively, processor 202 can be a controller or an application-specific integrated circuit.

Mass-storage device 210, memory 208, L2 cache 206, and L1 cache 204 are computer-readable storage devices that collectively form a memory hierarchy that stores data and instructions for processor 202. Generally, mass-storage device 210 is a high-capacity, non-volatile storage device, such as a disk drive or a large flash memory, with a large access time, while L1 cache 204, L2 cache 206, and memory 208 are smaller, faster semiconductor memories that store copies of frequently used data. Memory 208 can be a dynamic random access memory (DRAM) structure that is larger than L1 cache 204 and L2 cache 206, whereas L1 cache 204 and L2 cache 206 can be comprised of smaller static random access memories (SRAM). Such memory structures are well-known in the art and are therefore not described in more detail.

Starting from mass-storage device 210 and proceeding to L1 cache 204 (right to left in FIG. 2), at each level of the memory hierarchy, the number of entries for storing data is smaller than the number of entries at the next higher level. Because L1 cache 204, L2 cache 206, and memory 208 each have a smaller number of entries than the level of the memory hierarchy above them, each entry in these caches is available to store data from more cache line addresses (i.e., physical addresses) than the entries in the higher level.

In some embodiments of the present invention, some or all of the caches are "set-associative." Generally, in a set-associative cache, the entries in the cache are logically divided into a number of "sets" and "ways." A "set" is a group of cache entries that are used to store cache lines from the same predetermined range of physical addresses. A "way" is a logical division of the entries in the cache into two or more similar groups. For example, L1 cache 204 can be divided into four ways (see ways 302-308 in L1 cache 204 in FIG. 3). A set has exactly one entry in each way.

Some embodiments of the present invention use a function (a "hash function" or another function) to identify an entry within a given way for a specific cache line. Generally, the hash function takes an incoming cache line address as input and returns an entry identifier. The hash function can perform bit-level, logical, or mathematical operations on some or all of the bits in the incoming cache line address to produce an entry identifier. For example, the hash function can extract some of the bits in the incoming address and use these bits as the address of the entry.

In some embodiments of the present invention, processor 202 includes additional functional blocks that are organized in a similar fashion to the caches. Generally, these functional blocks are multi-way directories, lookup tables, or memory structures that use way prediction. For example, processor 202 can include translation lookaside buffer (TLB) 212 and branch target buffer (BTB) 214. TLB 212 provides virtual-address to physical-address translations, while BTB 214 stores the address of the last branch target for branches. The operations performed by these functional blocks are known in the art and hence they are not described in more detail.

Computer system 200 can be incorporated into many different types of electronic devices. For example, computer system 200 can be part of a desktop computer, a laptop computer, a server, a media player, an appliance, a cellular phone, a piece of testing equipment, a network appliance, a calculator, a personal digital assistant (PDA), a hybrid device (e.g., a "smart phone"), a guidance system, a toy, a control system (e.g., an automotive control system), or another electronic device.

Although we describe computer system 200 as including specific components, in alternative embodiments different components can be present in computer system 200. For example, in some embodiments, computer system 200 can include video cards, network cards, optical drives, and/or other peripheral devices that are coupled to processor 202 using a bus, a network, or another suitable communication channel. In some embodiments, computer system 200 can include one or more additional processors, wherein the processors share some or all of L2 cache 206, memory 208, and mass-storage device 210. In some embodiments, computer system 200 may not include some of the memory hierarchy (i.e., memory 208, and/or mass-storage device 210).

Way Prediction

Embodiments of the present invention use "way prediction" to improve the performance of circuit structures, such as L1 cache 204, L2 cache 206, memory 208, TLB 212, and BTB 214. Generally, given a circuit structure that includes multiple ways for storing data, way prediction involves predicting the way in which data resides when accessing the data. Way prediction takes advantage of the fact that data is typically found in the way in which the data was most recently accessed (e.g., read or written) in order to speed up data accesses.

In some embodiments of the present invention, way predictions are based on at least one prior access of the data. For example, assuming that a cache line is written to an entry in a given way in a cache, a cache controller for the cache can record the way in which the entry was written. When subsequently accessing the cache line, the cache controller can use the recorded way to predict the way in which the cache line resides.

In some embodiments of the present invention, when accessing the cache line after making a way prediction, the cache controller first checks only the predicted way to determine if the cache line resides in that way. If the cache line resides in the predicted way, the cache controller can access the cache line without checking the other ways in the cache, thereby saving power and avoiding delay. Otherwise, if the cache line is not in the predicted way, the cache controller checks the other ways to determine if the cache line is present in those ways, which can cause additional delay. If the cache line is present in another way, the cache controller "mispredicted" the way using the recorded way. (In contrast, if the cache line is not present in any way, it is a cache "miss.")

In comparison to existing systems that simply check all of the ways in the cache to find a cache line, if the way is mispredicted, embodiments of the present invention incur additional delay and consume additional power while checking all of the other ways for the cache line (because embodiments of the present invention first separately check the predicted way). Consequently, these embodiments avoid repeating way mispredictions by first determining that a predetermined number of way mispredictions have occurred for a given way prediction entry and then copying a cache line from the way where the cache line actually resides to the mispredicted way, thereby avoiding a subsequent misprediction. The copying process is described in detail below.

Although we describe way prediction using a cache for clarity and brevity, in some embodiments of the present invention, way prediction can be used in a similar way with TLB 212, BTB 214, or any other multi-way access structure. (Note also that TLB 212 and BTB 214 can be considered "caches.")

Cache

Figure 3:
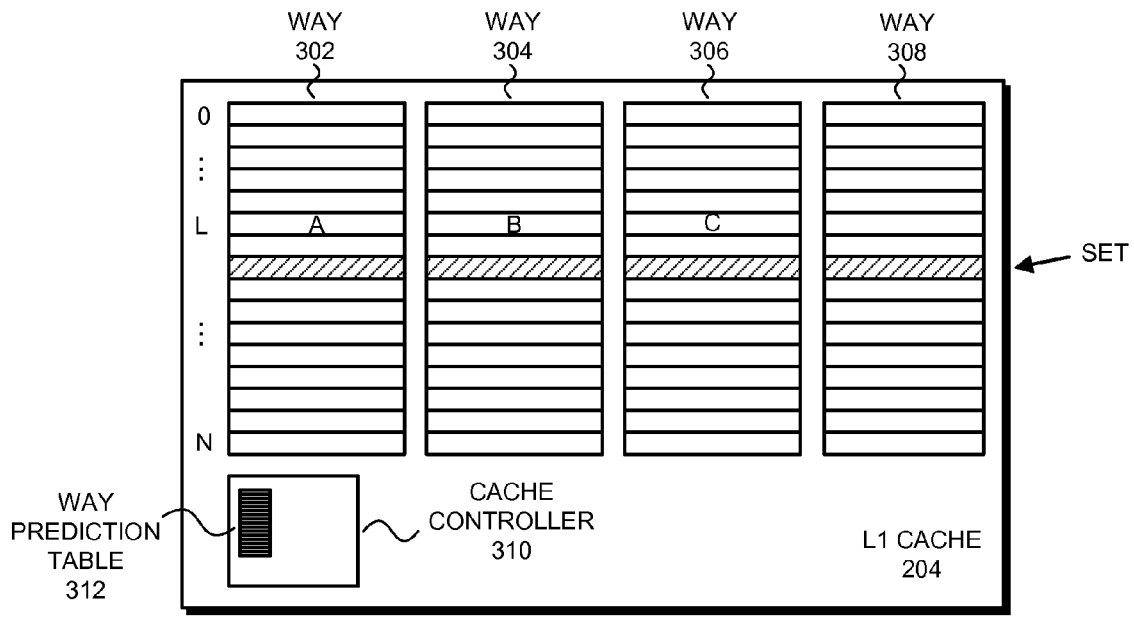
FIG. 3 presents a block diagram illustrating an expanded view of a cache in accordance with embodiments of the present invention.

FIG. 3 presents a block diagram illustrating an expanded view of L1 cache 204 in accordance with embodiments of the present invention. L1 cache 204 includes ways 302-308.

L1 cache 204 also includes cache controller 310, which controls the operation of L1 cache 204. For example, cache controller 310 can: perform checks to determine if cache lines reside in L1 cache 204; make way predictions and update way prediction table 312; allocate entries for storing cache lines; evict cache lines; communicate with other levels of the memory hierarchy; and perform other operations that are known in the art. In some embodiments of the present invention, cache controller 310 is a specialized circuit within L1 cache 204. In alternative embodiments, cache controller 310 is implemented by executing computer program instructions (e.g., program code, BIOS code from ROM, etc.) to configure general-purpose circuits to perform the herein-described operations.

Cache controller 310 includes way prediction table 312. Way prediction table 312 is used by cache controller 310 for keeping track of ways in which cache lines were accessed. For example, assuming that cache line A was accessed in way 302, cache controller 310 records the identity of the way in a corresponding entry in way prediction table 312. In some embodiments of the present invention, way prediction table 312 includes a separate entry for each set in L1 cache 204. In alternative embodiments, way prediction table 312 does not include a separate entry for each set in L1 cache 204.

Cache controller 310 uses a hash function to determine which entry in way prediction table 312 should be used for making a way prediction when accessing a given cache line. The hash function takes the cache line address (i.e., the physical address of the cache line) as an input and outputs an entry within way prediction table 312. The hash function can perform bit-level, logical, or mathematical operations on some or all of the bits in the incoming cache line address to produce an entry identifier. For example, the hash function can extract some of the bits in the cache line's address and use these bits as the address of the entry.

During operation, upon receiving a cache line to be accessed, cache controller 310 computes an entry in way prediction table 312 using the cache line's address as an input into the hash function for way prediction table 312. If there is a way recorded in the entry, cache controller 310 uses the recorded way as a prediction of the way where the cache line resides. Cache controller 310 then checks for the cache line in only the predicted way. Otherwise, if there is no entry in way prediction table 312, cache controller 310 checks all the ways (e.g., ways 302-308) for the cache line.

If the cache line is present in the predicted way, cache controller 310 accesses the cache line in that way. Otherwise, cache controller 310 checks the remaining ways for the cache line. If the cache line is present in one of the other ways, the way was mispredicted and cache controller 310 accesses the cache line in that way. If the way was mispredicted (or if there was no way recorded in the entry), cache controller 310 records the correct way in way prediction table 312. For example, assuming that the cache line in entry L was read from way 306, cache controller 310 updates the corresponding entry in the way prediction table 312 to indicate way 306 (e.g., sets the entry to "3" to indicate that the last access occurred in the third way). Note that the entries in way prediction table 312 are updated in this fashion for each misprediction.

As described in the preceding paragraphs, a corresponding entry in way prediction table 312 is updated with each misprediction. In existing systems that update entries in the way prediction table in this fashion, conflicting way prediction table updates (and hence way mispredictions) can result when cache lines are accessed in certain patterns. For example, assume that L1 cache 204 includes cache lines A and B in entry L in ways 302 and 304 as shown in FIG. 3. In existing systems, if the cache lines are accessed in an A-B-A-B . . . pattern and way prediction table 312 is updated with each access, each time that cache controller 310 predicts a way, the prediction is incorrect.

In embodiments of the present invention, cache controller 310 includes conflict detection circuitry to reduce such repeated way mispredictions. In these embodiments, cache controller 310 monitors cache line accesses to determine when a way has been mispredicted. Upon determining that a way has been mispredicted, cache controller 310 records the way misprediction (i.e., keeps track of the number of mispredictions that have been made based on the entries in way prediction table 312).

When a predetermined number of way mispredictions have been recorded for a given entry in way prediction table 312, cache controller 310 copies the data from the entry from the way where the cache line actually resides into the predicted way. For example, assume that cache line A resides in way 302 and cache line B resides in way 304 and the cache lines are accessed in an A-B-A-B . . . pattern. Given this access pattern, cache line A is repeatedly mispredicted as residing in way 304 and cache line B is repeatedly mispredicted as residing in way 302. Thus, in some embodiments of the present invention, after the predetermined number of mispredictions (e.g., 4 mispredictions) for the set for entry L in L1 cache 204, cache controller 310 copies cache line A from way 302 to way 304 (and does not update way prediction table 312, which already indicates way 304). The next time that either cache line B or cache line A is accessed, cache controller 310 predicts way 304, which is correct for both cache lines.

By copying data from one way into another when a conflict has been detected during way prediction, embodiments of the present invention enable more efficient operation of L1 cache 204 than existing systems. More specifically, embodiments of the present invention reduce the effect of conflicting access patterns (e.g., the A-B-A-B . . . pattern) by copying the cache line from a way where the cache line actually resides to a mispredicted way when such a conflict has been detected.

Note that although we describe an A-B-A-B . . . access pattern, other patterns can cause conflicting way predictions. For example, A-B-B-A . . . , or, assuming a third cache line C, A-B-C-B-A . . . . Embodiments of the present invention handle these access patterns (and the way prediction conflicts that they cause) in the same fashion as the A-B-A-B . . . pattern.

Conflict Detection Circuitry

Figure 4:
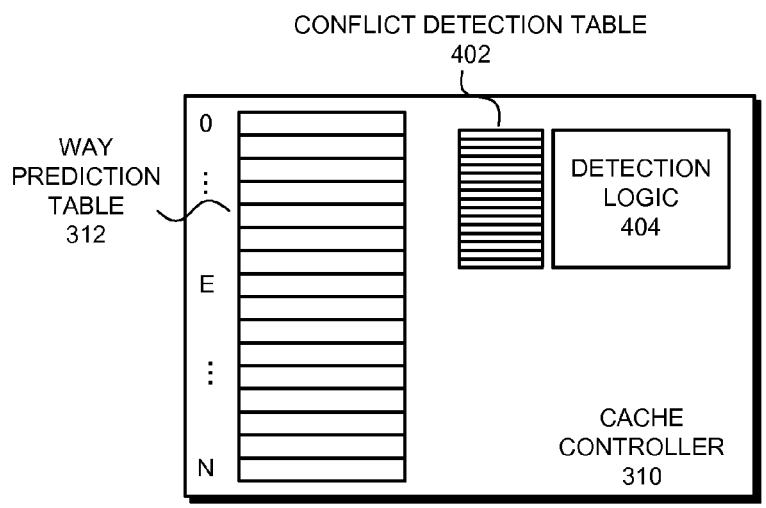
FIG. 4 presents a block diagram illustrating an expanded view of a cache controller in accordance with embodiments of the present invention.

FIG. 4 presents a block diagram illustrating the conflict detection circuitry in cache controller 310 in accordance with embodiments of the present invention. The conflict detection circuitry in cache controller 310 includes conflict detection table 402 and detection logic 404. Cache controller 310 uses the conflict detection circuitry to track way mispredictions and reduce conflicting updates to way prediction table 312.

In some embodiments of the present invention, conflict detection table 402 and detection logic 404 are specialized circuits within cache controller 310. In alternative embodiments, conflict detection table 402 and/or detection logic 404 is implemented by executing computer program instructions (e.g., program code, BIOS code, etc.) to configure general-purpose circuits to perform the herein-described operations.

Conflict Detection Table

Cache controller 310 uses conflict detection table 402 to keep track of the entries in way prediction table 312 (and hence the sets in L1 cache 204) for which way mispredictions have occurred. Conflict detection table 402 includes a number of entries for keeping these "misprediction records." In some embodiments of the present invention, the number of entries is equal to the number of entries in way prediction table 312 (i.e., conflict detection table 402 includes a separate entry for each entry in way prediction table 312). In alternative embodiments, the number of entries in conflict detection table 402 is less than the number of entries in way prediction table 312.

In embodiments of the present invention wherein conflict detection table 402 includes a separate entry for each entry in way prediction table 312, the entries in conflict detection table 402 include a field for recording the number of mispredictions. In addition, in some embodiments of the present invention, the entries can include one or more additional fields for recording the way in which the data was mispredicted (or the way in which the data actually resided) and/or other information about the misprediction.

In these embodiments, at startup, the entries in conflict detection table 402 contain no misprediction records (e.g., are all set to zero). When a first way misprediction occurs based on a given entry in way prediction table 312, cache controller 310 updates the misprediction record for that entry in conflict detection table 402 to indicate that the misprediction occurred. For example, assuming that a first way misprediction occurred based on entry E in way prediction table 312, cache controller 310 updates the corresponding entry in conflict detection table 402 to indicate that the misprediction occurred (e.g., sets the entry in conflict detection table 402 to "1").

Upon detecting subsequent way mispredictions based on entry E in way prediction table 312, cache controller 310 can update the corresponding entry in conflict detection table 402 to indicate that the misprediction occurred (e.g., increment the entry in conflict detection table 402 as each subsequent way misprediction occurs).

Note that because way prediction table 312 in this example includes a separate entry for each entry in way prediction table 312, these embodiments can simply update the corresponding records in conflict detection table 402 to indicate the number of mispredictions that have occurred based on the entry in way prediction table 312. The record of the number of way mispredictions and the identity of the entry in way prediction table 312 (which can be determined from the identity of the entry in conflict detection table 402) is sufficient for cache controller 310 to uniquely identify repeating way mispredictions.

In embodiments of the present invention wherein conflict detection table 402 does not include a separate entry for each entry in way prediction table 312, the entries in conflict detection table 402 can include: (1) a field for recording the number of mispredictions; and (2) an identification of the entry in way prediction table 312 upon which the misprediction was based. In addition, in some embodiments of the present invention, the entries can include one or more additional fields for recording the way in which the data was mispredicted to reside (or the way in which the data actually resided) and/or other information about the misprediction.

In these embodiments, at startup, the entries in conflict detection table 402 contain no misprediction records. When a first way misprediction occurs based on a given entry in way prediction table 312, cache controller 310 updates a misprediction record for the entry in conflict detection table 402 to indicate that the misprediction occurred. In these embodiments, updating a misprediction record for the entry in conflict detection table 402 involves allocating an entry in conflict detection table and then updating the allocated entry with the number of mispredictions (e.g., "1") and an identification of the entry in way prediction table 312 upon which the misprediction was based. For example, assuming that a first way misprediction occurred based on entry E in way prediction table 312, cache controller 310 allocates an entry in conflict detection table 402 and updates the allocated entry to indicate that the first misprediction has occurred for entry E.

Upon detecting subsequent way mispredictions based on entry E in way prediction table 312, cache controller 310 can update the allocated entry in conflict detection table 402 to indicate that the misprediction occurred (e.g., increment the entry in conflict detection table 402 as each subsequent way misprediction occurs).

In the embodiments of the present invention where conflict detection table 402 does not include a separate entry for each entry in way prediction table 312, it is possible for all the entries in conflict detection table 402 to be allocated when cache controller 310 needs to allocate an entry. Thus, in these embodiments cache controller 310 replaces the entries in conflict detection table 402 in a predetermined way. For example, these embodiments can replace entries in conflict detection table 402: (1) randomly; (2) using a least-recently-used (LRU) technique; (3) using a first-in-first-out (FIFO) technique; or (4) replacing the entry with the lowest way prediction conflict count.

In some embodiments of the present invention, conflict detection table 402 is a cache.

In some embodiments of the present invention, the entries in conflict detection table 402 are periodically cleared, cleared after a predetermined time, have their counts reduced after a predetermined event, or cleared after a predetermined event (e.g., interrupt, use of the way prediction entry for a correct prediction, garbage collection, etc.) to avoid false detections of repeating mispredictions. For example, the entries in conflict detection table can be cleared by cache controller 310 after a predetermined number of milliseconds or after a cache line is copied from the way where it actually resides to a mispredicted way.

Detection Logic

Detection logic 404 monitors the entries in conflict detection table 402 to determine when an entry in conflict detection table 402 indicates that a predetermined number of way mispredictions has occurred for a given entry in way prediction table 312. For example, detection logic 404 can monitor the entries in conflict detection table 402 to determine when 8, 10, or another number of mispredictions has occurred for a given entry. Upon detecting the predetermined number of mispredictions for the given entry, detection logic 404 signals cache controller 310 to copy the cache line from the way in which the cache line actually resides to the mispredicted way (i.e., the way for which the repeated mispredictions are occurring).

For example, assume that: (1) L1 cache 204 contains cache lines A and B as shown in FIG. 3; (2) no way is yet recorded in entry E of way prediction table 312; (3) the hash function for way prediction table 312 returns entry E for both cache line A and cache line B; (4) conflict detection table 402 includes a separate entry for each entry in way prediction table 312; and (5) after detecting two mispredictions, detection logic 404 signals cache controller 310 to copy the data from the way in which the cache line actually resides to the mispredicted way. (Note that although we describe detecting only two mispredictions for brevity and clarity, embodiments of the present invention work with different numbers of way mispredictions in the same fashion.)

Cache controller 310 first receives an access request for cache line A. Cache controller 310 then uses the hash function for way prediction table 312 to determine that entry E should store a record of the last way accessed for cache line A. Because entry E does not contain a record for cache line A (because no way is yet recorded in entry E), cache controller 310 does not make a way prediction, but instead checks each way and finds cache line A in entry L in way 302. Cache controller 310 next accesses cache line A in way 302 and updates entry E in way prediction table 312 to indicate that cache line A was accessed in way 302 (e.g., by writing a "0" into the entry in way prediction table 312).

Cache controller 310 subsequently receives an access request for cache line B. After using the hash function for way prediction table 312 to determine that entry E should be used to store the way record for the cache line B, cache controller 312 retrieves the way prediction from entry E in way prediction table 312. Based on the update made when accessing cache line A, cache controller 310 predicts that cache line B resides in way 302. Upon checking way 302, cache controller does not find cache line B. Cache controller 310 then checks the remaining ways (i.e., ways 304-308) and finds cache line B in way 304, which indicates that cache line B was mispredicted.

Cache controller 310 detects the first misprediction based entry E in way prediction table 312 and updates the corresponding entry in conflict detection table 402 to indicate that one misprediction has occurred. Because one misprediction is less than the predetermined number, detection logic 404 does not signal cache controller 310. Hence, cache controller 310 accesses cache line B in way 304 and updates entry E in way prediction table 312 to indicate that cache line B was accessed in way 304 (e.g., by writing a "1" into the entry in way prediction table 312).

Cache controller 310 than again receives an access request for cache line A and retrieves the way prediction from entry E in way prediction table 312. Based on the update made when accessing cache line B, cache controller 310 predicts that cache line A resides in way 304. Upon checking way 304, cache controller does not find cache line A. Cache controller 310 then checks the remaining ways (i.e., ways 302 and 306-308) and finds cache line A in way 302, which indicates that cache line A was mispredicted.

Cache controller 310 detects the second misprediction based on entry E in way prediction table 312 and updates the corresponding entry in conflict detection table 402 to indicate that two mispredictions have occurred.

Detection logic 404 next detects that the entry in conflict detection table 402 is equal to the predetermined number, thereby indicating that repeating way mispredictions are being made based on entry E in way prediction table 312. Thus, detection logic 404 signals cache controller 310 to search for cache line A in another way in L1 cache 204 and, if cache line A can be found, to copy cache line A from the way where cache line A is found to the mispredicted way. Cache controller 310 finds cache line A in way 302 and copies cache line A to way 304. Cache controller 310 then clears the entry in conflict detection table 402, but does not update the entry in way prediction table 312 (thereby leaving the entry in way prediction table 312 indicating way 304).

Cache controller 310 then repeats the access of cache line A (using the above-described operations). Because cache line A has been copied to the way that is predicted by the entry in way prediction table 312 (way 304), the subsequent way prediction made by cache controller 310 is correct and cache line A can be accessed in the predicted way.

Process for Avoiding Conflicting Way Predictions

Figure 5:
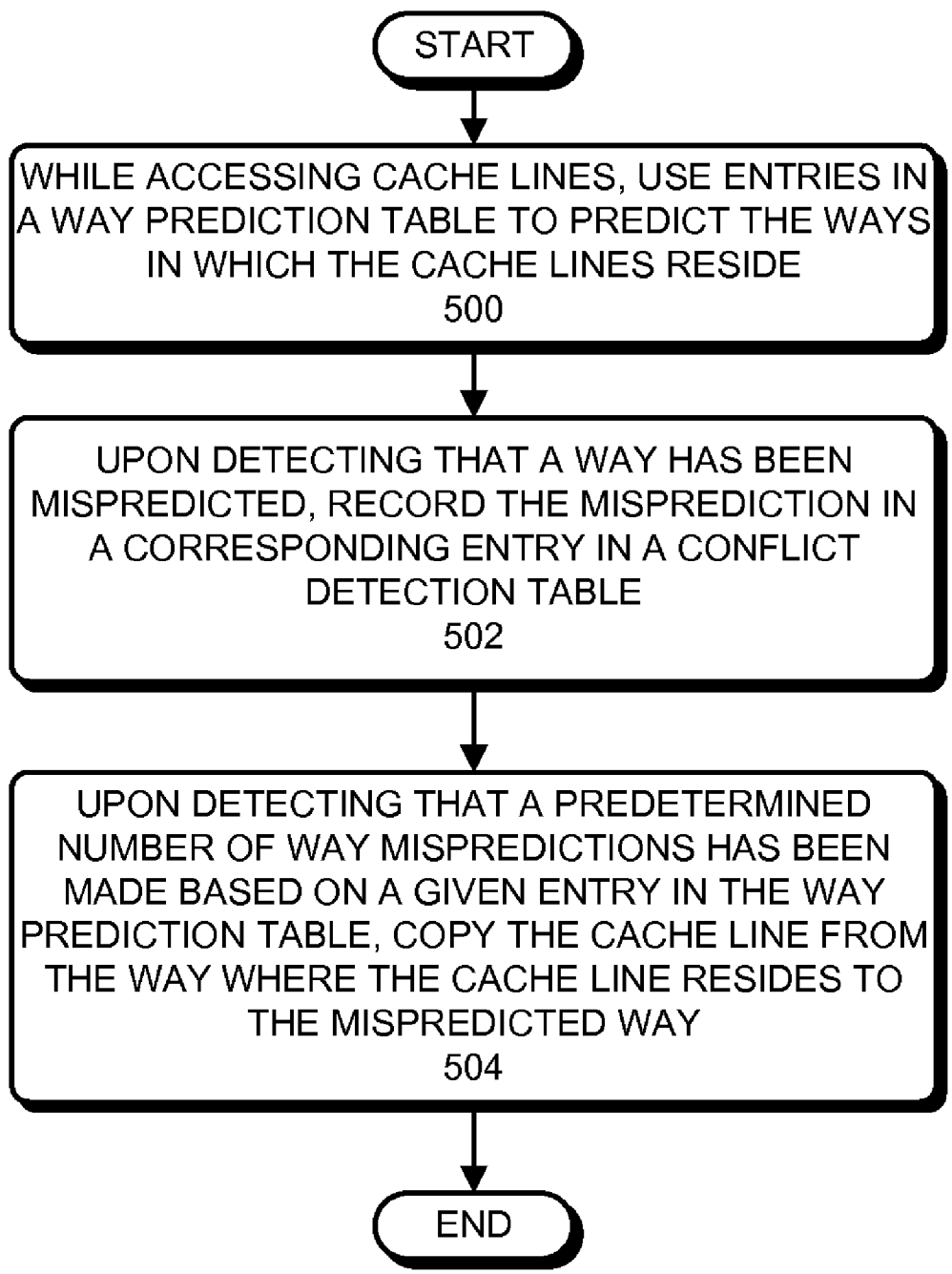
FIG. 5 presents a flowchart illustrating a process for avoiding conflicting way predictions in accordance with embodiments of the present invention.

FIG. 5 presents a flowchart illustrating a process for avoiding conflicting way predictions in accordance with embodiments of the present invention. The following example refers to L1 cache 204 and cache controller 310 as shown in FIGS. 2-4. Although we use L1 cache 204 and cache controller 310, in some embodiments of the present invention these operations can be performed in L2 cache 206, TLB 212, BTB 214, or in other structures.

The process starts when cache controller 310 accesses cache lines in L1 cache 204. While accessing the cache lines, cache controller 310 uses entries in way prediction table 312 to predict the ways in which cache lines reside (step 500). Upon determining that a way has been mispredicted, cache controller 310 records the misprediction in a corresponding entry in conflict detection table 402 (step 502).

Upon detecting that a predetermined number of mispredictions has been made based on a given entry in the way prediction table 312, cache controller 310 copies the cache line from the way where the cache line resides into the mispredicted way (step 504).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for handling way mispredictions in a multi-way cache, comprising:
receiving requests to access cache lines in the cache;
for each request,
making a prediction of a way in the cache in which the cache line resides based on a corresponding entry in a way prediction table;
checking for the cache line in the predicted way;
upon determining that the cache line does not reside in the predicted way but does reside in a different way and hence the way was mispredicted, incrementing a record in a conflict detection table corresponding to the entry in the way prediction table; and
upon detecting that a record in the conflict detection table indicates that a number of mispredictions based on the corresponding entry in the way prediction table equals a predetermined value, copying the cache line from the way where the cache line resides into the predicted way.

2. The method of claim 1, wherein the cache is a data cache, an instruction cache, a branch target buffer, or a translation lookaside buffer.

3. The method of claim 1, wherein upon accessing a cache line in a way in the cache, the method further comprises updating the corresponding entry in the way prediction table by recording the way in which the cache line was accessed.

4. The method of claim 3, wherein if the cache line is available in the predicted way, the method further comprises accessing the cache line in the predicted way.

5. The method of claim 3, wherein upon determining that the way was mispredicted, the method further comprises accessing the cache line in the different way.

6. The method of claim 3, wherein using entries in the way prediction table to make predictions involves:
retrieving a recorded way from the corresponding entry in the way prediction table; and
using the way indicator as the prediction of the way in which the cache line resides.

7. The method of claim 1, wherein the conflict detection table includes a separate entry for each entry in the way prediction table and updating the record in the conflict detection table involves incrementing the number of mispredictions in the entry in the conflict detection table.

8. The method of claim 1, wherein the conflict detection table does not include a separate entry for each entry in the way prediction table and updating the record in the conflict detection table involves:
if an existing record is not available in the conflict detection table:
allocating an entry in the conflict detection table;
recording in the allocated entry an identifier of entry in the way prediction table upon which the misprediction was based; and
incrementing the number of mispredictions in the allocated entry;
otherwise:
incrementing the number of mispredictions in an existing entry in the conflict detection table for the entry in the way prediction table upon which the misprediction was based.

9. An apparatus for handling way mispredictions in a multi-way cache, comprising:
the multi-way cache;
a cache controller in the cache;
a way prediction table in the cache controller;
a conflict detection table in the cache controller;
wherein the cache controller is configured to receive requests to access cache lines in the cache;
wherein for each request, the cache controller is configured to:
make a prediction of a way in the cache in which the cache line resides based on a corresponding entry in the way prediction table;
check for the cache line in the predicted way;
upon determining that the cache line does not reside in the predicted way but does reside in a different way and hence the way was mispredicted, increment a record in the conflict detection table corresponding to the entry in the way prediction table; and
upon detecting that a record in the conflict detection table indicates that a number of mispredictions based on the corresponding entry in the way prediction table equals a predetermined value, the cache controller is configured to copy the cache line from the way where the cache line resides into the predicted way.

10. The apparatus of claim 9, wherein the cache is a data cache, an instruction cache, a branch target buffer, or a translation lookaside buffer.

11. The apparatus of claim 9, wherein upon accessing a cache line in a way in the cache, the cache controller is configured to update the corresponding entry in the way prediction table to record the way in which the cache line was accessed.

12. The apparatus of claim 11, wherein if the cache line is available in the predicted way, the cache controller is configured to access the cache line in the predicted way.

13. The apparatus of claim 11, wherein the cache controller is configured to access the cache line in the different way.

14. The apparatus of claim 11, wherein when using entries in the way prediction table to make predictions, the cache controller is configured to:
retrieve a recorded way from the corresponding entry in the way prediction table; and use the way indicator as the prediction of the way in which the cache line resides.

15. The apparatus of claim 9, wherein the conflict detection table includes a separate entry for each entry in the way prediction table and when updating the record in the conflict detection table, the cache controller is configured to increment the number of mispredictions in the entry.

16. The apparatus of claim 9, wherein the conflict detection table does not include a separate entry for each entry in the way prediction table and when updating the record in the conflict detection table, if an existing record is not available in the conflict detection table, the cache controller is configured to:
   allocate an entry in the conflict detection table;
   record in the allocated entry an identifier of entry in the way prediction table upon which the misprediction was based; and
   increment the number of mispredictions in the allocated entry;
   otherwise, if an existing record is available in the conflict detection table, the cache controller is configured to:
   increment the number of mispredictions in an existing entry in the conflict detection table for the entry in the way prediction table upon which the misprediction was based.

17. A computer system for handling way mispredictions in a multi-way cache, comprising:
   a processor coupled to the multi-way cache, wherein the multi-way cache stores data for the processor;
   a cache controller in the cache;
   a way prediction table in the cache controller;
   a conflict detection table in the cache controller;
   wherein the cache controller is configured to receive requests to access cache lines in the cache;
   wherein for each request, the cache controller is configured to:
      make a prediction of a way in the cache in which the cache line resides based on a corresponding entry in the way prediction table;
      check for the cache line in the predicted way;
      upon determining that the cache line does not reside in the predicted way but does reside in a different way and hence the way was mispredicted, increment a record in the conflict detection table corresponding to the entry in the way prediction table; and
      upon detecting that a record in the conflict detection table indicates that a number of mispredictions based on the corresponding entry in the way prediction table equals a predetermined value, the cache controller is configured to copy the cache line from the way where the cache line resides into the predicted way.

18. The computer system of claim 17, wherein the conflict detection table includes a separate entry for each entry in the way prediction table and when updating the record in the conflict detection table, the cache controller is configured to increment the number of mispredictions in the entry.

19. The computer system of claim 18, wherein the conflict detection table does not include a separate entry for each entry in the way prediction table and when updating the record in the conflict detection table, if an existing record is not available in the conflict detection table, the cache controller is configured to:
   allocate an entry in the conflict detection table;
   record in the allocated entry an identifier of entry in the way prediction table upon which the misprediction was based; and
   increment the number of mispredictions in the allocated entry;
   otherwise, if an existing record is available in the conflict detection table, the cache controller is configured to:
   increment the number of mispredictions in an existing entry in the conflict detection table for the entry in the way prediction table upon which the misprediction was based.

* * * * *